Feb. 9, 1932.　　　　C. W. WHITE　　　　1,843,999
METHOD FOR TREATING INTERNAL COMBUSTION ENGINE EXHAUSTS
Filed Oct. 24, 1925　　　5 Sheets-Sheet 1

Feb. 9, 1932. C. W. WHITE 1,843,999
METHOD FOR TREATING INTERNAL COMBUSTION ENGINE EXHAUSTS
Filed Oct. 24, 1925 5 Sheets-Sheet 3

Inventor
Clarence W. White
By Lancaster and Allwine
Attorney

Feb. 9, 1932.   C. W. WHITE   1,843,999
METHOD FOR TREATING INTERNAL COMBUSTION ENGINE EXHAUSTS
Filed Oct. 24, 1925   5 Sheets-Sheet 4

Clarence W. White
Inventor

Feb. 9, 1932.  C. W. WHITE  1,843,999
METHOD FOR TREATING INTERNAL COMBUSTION ENGINE EXHAUSTS
Filed Oct. 24, 1925  5 Sheets-Sheet 5

Inventor
Clarence W. White

Patented Feb. 9, 1932

1,843,999

UNITED STATES PATENT OFFICE

CLARENCE WILBUR WHITE, OF EVANSTON, ILLINOIS, ASSIGNOR OF PART INTERESTS TO GUY P. LONG, OF SHELBY COUNTY, TENNESSEE, AND ERMA WHITE AND YETTA STEIN, BOTH OF CHICAGO, ILLINOIS

METHOD FOR TREATING INTERNAL COMBUSTION ENGINE EXHAUSTS

Application filed October 24, 1925. Serial No. 64,706.

This invention relates to improvements in means for neutralizing and eliminating carbon monoxide exhaust gases from internal combustion engines.

The primary object of this invention is the provision of improvements in methods and apparatus for the purpose of eliminating and neutralizing poisonous carbon monoxide gases discharged from internal combustion engines, and rendering the exhaust gases from internal combustion engines harmless.

Due to the practically universal and extensive use of motor vehicles, utilizing internal combustion engines, the discharge of carbon monoxide gases from the exhaust of motor vehicles has become a menace to such an extent that the public health is threatened. It is a purpose of this invention to use novel and simple means for the purpose of eliminating and neutralizing the carbon monoxide gases from internal combustion engines, so as to discharge a harmless gas, in the nature of carbon dioxide.

A further object of this invention is the provision of improved means for neutralizing and eliminating carbon monoxide gases discharged from internal combustion engines, by direct air oxidation of the carbon monoxide gases in a novel and efficient manner.

A further object of this invention is the provision of improved means for the catalytic oxidation of carbon monoxide gas discharges from internal combustion engines and the like.

A further object of this invention is the provision of novel direct air and catalytic oxidation of carbon monoxide gases discharged from internal combustion engines, for the purpose of rendering them harmless and converting them into carbon dioxide.

A further object of this invention is the provision of an absorption treatment of carbon monoxide gas discharge from internal combustion engines, for the purpose of converting the same into carbon dioxide or analogous harmless gas.

A further object of this invention is the provision of means for treating carbon monoxide gases, the means preferably comprising a chemical reagent in non-fluid condition, which chemically reacts with the carbon monoxide and to convert the same into a harmless gas, such as carbon dioxide.

Other objects and advantages of this invention will be apparent during the course of the following detailed description.

In the accompanying drawings, forming a part of this specification, and wherein similar reference characters designate corresponding parts throughout the several views.

Referring to the form of invention illustrated in Figures 1 to 6 inclusive, showing the direct air oxidation of internal combustion engine exhaust gases, the same shows probably the cheapest means of removing carbon monoxide from exhaust gases of internal combustion engines. In this form of invention the exhaust manifold 20 of the internal combustion engine A has communication with a conventional type of muffler B, through a conduit or pipe 21, through which the exhaust gases flow from the manifold 20, in conventional manner.

Figures 1, 2, 3, 4, 5, 6:
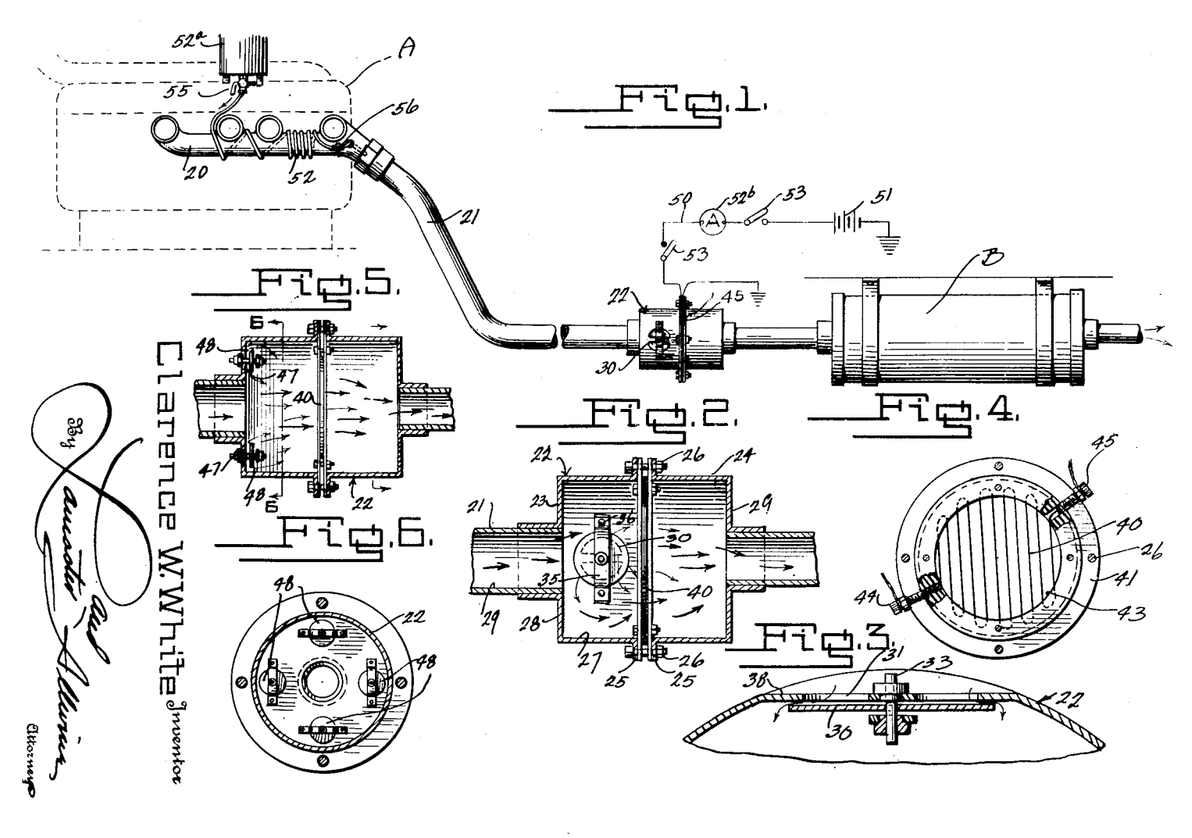
Figure 1 is a fragmentary side elevation of improved apparatus for carrying out the direct air oxidation of carbon monoxide gases, to eliminate and neutralize the same, the apparatus being used in cooperative conjunction with an internal combustion engine exhaust manifold and conventional muffler.
Figure 2 is a fragmentary sectional view taken longitudinally of the oxidation receptacle or chamber of the direct air oxidation apparatus.
Figure 3 is an enlarged fragmentary sectional view showing an air inlet check valve for the oxidation chamber illustrated in Figure 2.
Figure 4 is a side elevation of an electric grid for use in the oxidation chamber of Figure 3.
Figure 5 is a somewhat modified form of direct air oxidation chamber.
Figure 6 is a cross sectional view taken substantially on the line 6—6 of Figure 5.

In the part 21 for conducting the exhaust gases to the muffler B is provided the oxidation receptacle 22, which is preferably of cylindrical formation, of considerably larger diameter than the pipe 21. The oxidation receptacle 22 is preferably formed of sections 23 and 24, provided at their facing edges with attaching flanges 25, adapted to receive bolts 26 by means of which to connect the sections 23 and 24, to enclose the oxidation compartment 27. By the provision of these sections 23 and 24, it is understood that the cylindrical oxidation receptacle or chamber 22 is divided transversely, and the conduit or pipe 21 has connection with the sections 23 and 24, in the end walls 28 and 29 respectively, so that the passageway 29 of the exhaust gas pipe 21 communicates with the enlarged oxidation compartment 27. In order to eliminate carbon monoxide gases from the exhaust internal combustion engine gases, and render the same harmless as by converting it into carbon dioxide, a relatively high temperature is required, and the introduction of fresh air thru the oxidation chamber 27, in advance of the heating medium is desired. To this end it is proposed to provide a check valve 30, operating over a port 31 which may be provided in the section 23 of the oxidation receptacle 22; the receptacle 22 being provided with a pin 33 axially of the port 31, upon which the check valve is reciprocably mounted. A movement limiting and supporting bracket 35 is connected at its ends, at 36, to the oxidation receptacle 22, extending diametrically in spaced relation with the port 31, so that the check valve 30 may be placed between the same and the port 31, for limited sliding movement between the port 31 and said member 35. It is readily apparent that incident to any pulsating or fluctuating current in the exhaust line 21, fresh air may be drawn thru the port 31, incident to opening of the check valve 30, and if the pressure builds within the exidation compartment 27, the check valve 30 is snapped shut against the front wall portion 38 of the oxidaton receptacle 22, as illustrated in Figure 3 of the drawings, to shut off possible discharge of poisonous gases. With this check valve construction, means is provided for insuring a sufficient inlet of fresh air to the oxidation compartment 27, to effect the neutralization and oxidation treatment of the poisonous carbon monoxide gases of the exhaust from the engine.

As before mentioned heat energy is necessary to promote the reaction between the air and carbon monoxide of the exhaust gases, and the heating medium is supplied electrically by means of providing a grid 40, supported by a ring-shaped insulating frame 21, which is clamped between the sections 23 and 24 of the oxidation receptacle 22; the said ring-shaped insulating frame being provided with suitable openings for the transverse disposition of the bolt 26 therethrough. The grid 40 extends in parallel lines, or in any other similar arrangement across the opening 42 of said frame, and ends of the grid wire are provided with terminal binding nuts or screws 44 and 45, by means of which connecting wires of a circuit may be connected in the grid. The grid 40 when in position in the oxidation receptacle is disposed in a plane transverse to the line of flow of the exhaust gases, and succeeds the introduction of the fresh air into the oxidation chamber.

As an alternative form of oxidation receptacle, the form of invention illustrated in Figures 5 and 6 may be provided, which differs only from the form of oxidation receptacle illustrated in Figure 2, in that the oxidation chamber or receptacle illustrated in Figures 5 and 6 has the end wall 23 thereof, at the side of the receptacle facing the exhaust manifold, provided with a plurality of ports 47 therein, each port being provided with a check valve 48, altogether similar to the check valve structure detailed in Figure 3 of the drawings, and above described, the check valve 48 insuring that an adequate amount of fresh air for carbon monoxide oxidation will be inlet to the oxidation compartment.

The quantity of air admitted to the oxidation compartment 47 is not sufficient to permit explosion taking place in the presence of carbon monoxide and the heating medium, but it is sufficient to oxidize the carbon monoxide. In lieu of providing the check valves as a means of regulating air inlet to the oxidation compartment 27, a positive blower system may be provided for forcing air into the oxidation compartment 27, without relying upon the automatic air inlet action of the check valves.

It is to be noted that the heated grid is placed in position so that the hot exhaust gases and introduced air must pass therethrough. The metallic wire of this grid may be covered with a protective refractory material, if desired, such a mixture of thorium and cerium oxides, or calcium and magnesium oxides, or the material of the grid may be platinum or other metals sufficiently resistant as to obviate the necessity of otherwise protecting the same.

The grid 40 is preferably disposed in a circuit 50, which may be part of the conventional automotive vehicle circuit. The circuit 50 includes the terminals 44 and 45 of the grid, and this circuit may have therein a storage battery 51; ammeter or other current use indicating device 52, and control switches 54 may be provided in said circuit at suitable intervals. The circuit system for the grid may vary considerably, but it is important to note that the efficiency of operation of the system may be determined by noting that the heating grid is using current, the same being indicated on the ammeter 52, and thus insuring the safe operation of the system.

In connection with the direct air oxidation of carbon monoxide gases, to convert them into harmless carbon dioxide, or to neutralize the same, it may be desirable to introduce steam into the flow line of the exhaust gases, to facilitate reaction. To this end I prefer to place a coil 52 directly about the exhaust manifold 20, the same having communication at one end with a suitable tank 52, which permits a drop feed of water into the coil. The coil at its opposite end enters the exhaust manifold compartment, or the pipe 21, for discharging the steam generated in the coil into the flow line of the exhaust gases. Water or moisture may be otherwise pumped into the exhaust line, than by the means indicated. The conduit of the coil 52 after entering the exhaust pipe or the pipe 21 may run to any desired length directly along the line of flow of the exhaust gases, in order to insure steam generation of the water from the boiler or tank 52. It is preferred to provide valves 65 and 66 at both ends of the coil 52, so as to completely cut out this feature and control the same, as desired.

Referring to the catalytic oxidation of the carbon monoxide gases of internal combustion engine exhaust gases, apparatus for said catalytic oxidation is illustrated in Figures 7 to 10 inclusive, and consists in the placing of a catalytic oxidizer or receptacle 60 in the pipe line 61 between the exhaust manifold of the internal combustion engine C and the muffler D.

Figures 7, 8, 9, 10:
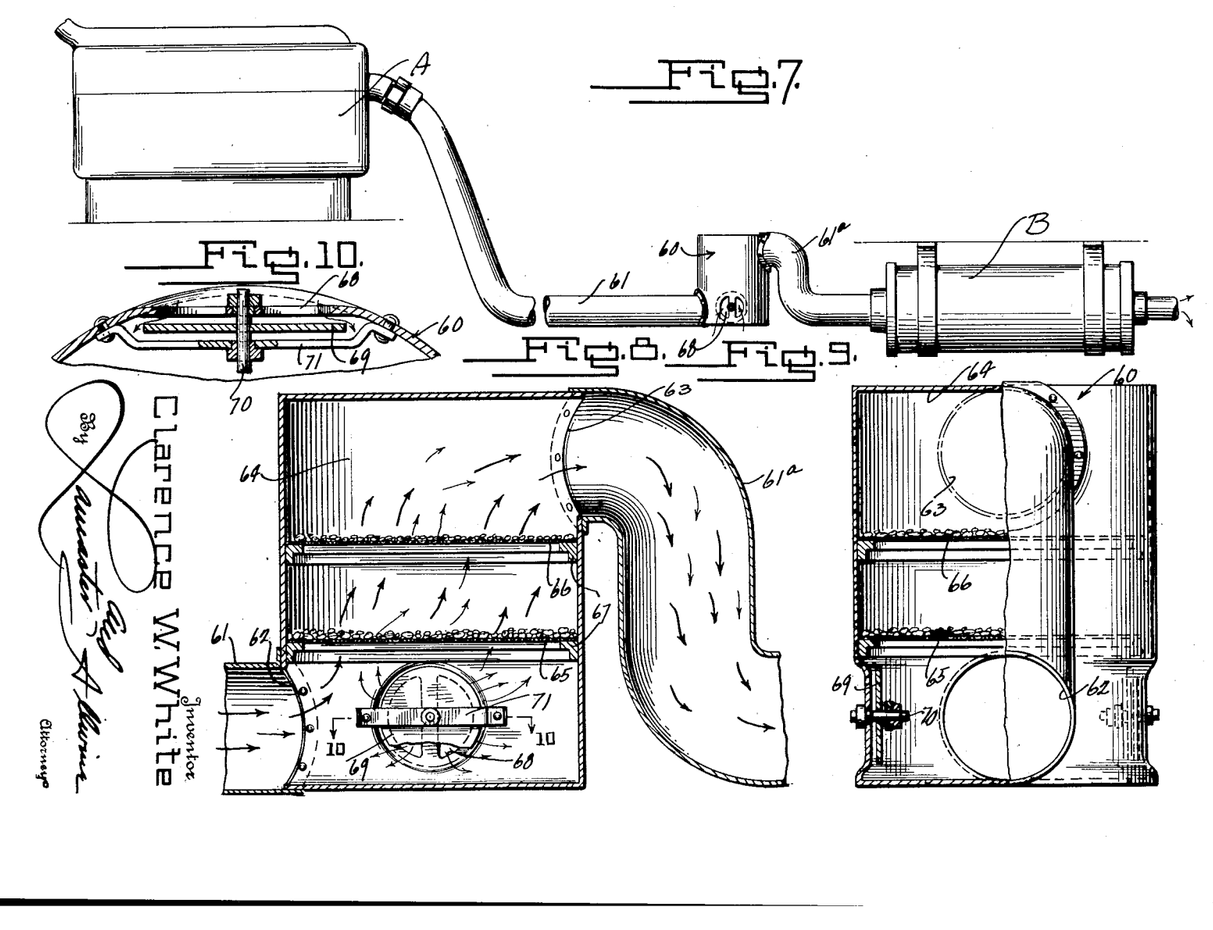
Figure 7 is a fragmentary side elevation of a modified form of the invention, the same showing apparatus for use in connection with the catalytic oxidation of carbon monoxide gases, and showing more particularly the catalytic oxidizer cooperative connection with the internal combustion engine exhaust manifold and muffler.
Figure 8 is an enlarged fragmentary vertical sectional view taken through the catalytic chamber illustrated in Figure 7.
Figure 9 is a fragmentary view, partly in section, of the catalytic chamber.
Figure 10 is a fragmentary enlarged sectional view through a check valve structure of the catalytic chamber.

The catalytic oxidizer 60 is preferably in the form of a cylindrical receptacle. The exhaust gas pipe 61 connects therewith from the internal combustion engine, thru an opening 62 in the lower portion of the receptacle or oxidizer 60, and the outlet portion 61$^a$ of the exhaust gas pipe, between the oxidizer and the muffler B connects with an opening 63 on the top of the oxidizer receptacle 60, on the opposite side of the receptacle from the opening 62. It is to be noted that the compartment 64 in the receptacle 60 is vertically positioned, and within this receptacle is preferably provided upper and lower screens 65 and 66 respectively, of wire gauze, of any approved mesh suitable for holding the specific type of catalytic used; these screens being supported upon annular flanges or rings 67 properly fixed in the receptacle compartment 64. The catalytic supporting screens 65 and 66 are of course placed in parallel planes between the openings 62 and 63 directly in the path thru which the exhaust gases must flow on their passage thru the catalytic chamber 64. The catalyst shown in the drawings is supported upon the screens 65 and 66, and this catalyst may be of any approved type which will efficiently cause the oxidation of the carbon monoxide gas, in order to neutralize and render the same harmless. As catalytic agent I may use platinum; palladium; or any of the metallic oxides such as manganese dioxide; cobaltic oxide; copper oxide; and silver oxide or in mixture. Carbonates and silicates, as inert materials assist the oxides in the catalytic oxidation. Nickel, cobalt and iron, in finely divided conditions may be used as catalytic agents. The catalyst is placed in layers on the screens in even distributed relation, so that the exhaust gases must of necessity pass thereover for neutralization of the carbon monoxide gas. The screens may be provided with approved filters to remove solid particles since they tend to accumulate on the catalyst.

It is desirable to supply fresh air to the compartment 64 and the catalyst, in order to carry forward the oxidation of the carbon monoxide gas efficiently. To this end, the receptacle 60 below the lower screen 65, and in the path across which the exhaust gases pass before going thru the screen supported catalyst, is provided with a port 68 in a side of the receptacle 60, with which a check valve 69 of the disc type cooperates; said check valve 69 being of the type above described, and being reciprocably supported upon a suitable pin 70 and limited in its motion by means of a diametrically disposed bracket 71 spaced from the receptacle 60, as is illustrated in Figure 10 of the drawings. Due to the heat of the exhaust gases the condensation of moisture or formation of wet steam is prevented, and thus the reaction proceeds much more readily.

Figures 11, 12:
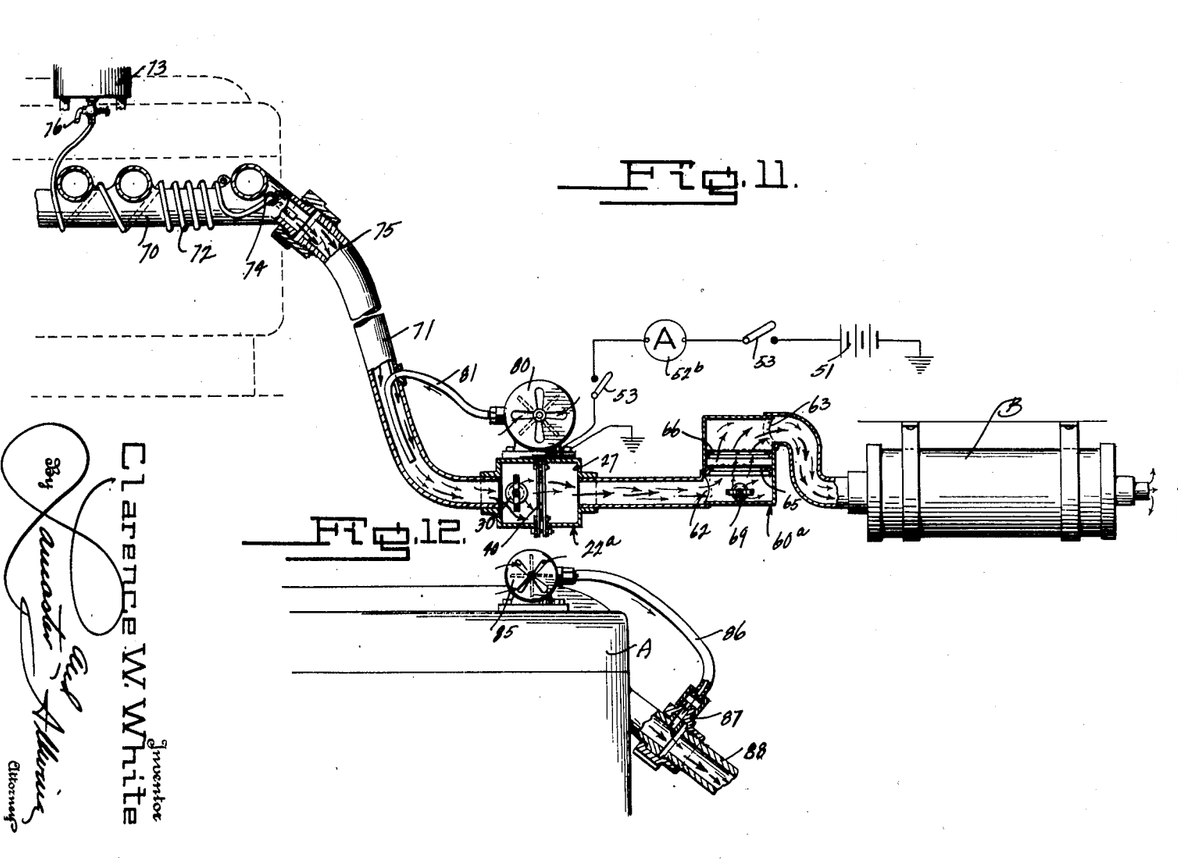
Figure 11 is a further modified form of the invention, showing the use of a combined direct air and catalytic oxidation apparatus in cooperative relation to an internal combustion engine exhaust manifold and muffler.
Figure 12 is a fragmentary view, partly in section, showing means for supplying air under force to the exhaust gases prior to oxidation treatment thereof.

It is contemplated to combine the direct air oxidation treatment and catalytic oxidation treatment of the exhaust gases, and to this end apparatus such as illustrated in Figure 11 may be employed. With such apparatus the exhaust manifold 70 of the internal combustion engine A has connection with the muffler D by means of a pipe 71. In the pipe 71 is provided a direct air oxidation receptacle 22ª, such as above described for the form of invention illustrated in Figures 1 to 6 inclusive, and the same reference characters have been applied to the parts of the invention for said direct air oxidation receptacle 22ª, as shown in Figures 1 to 4 of the drawings. Between the direct air oxidation receptacle 22ª and the muffler B is provided a catalytic oxidizer 60ª, of the type described above and illustrated in Figures 7 to 10 inclusive of the drawings, and similar reference characters have been applied to common features of these forms of the invention.

For the introduction of steam to the exhaust gases, in advance of the direct air oxidation treatment, it is preferred to provide a heater coil 72, about the exhaust manifold, into which water is fed from a drip tank 73. At the inlet end of the manifold 70 a control valve 74 is provided, and adjacent thereto the coil enters the passageway 75 of the pipe 71, and continues therealong for any desired distance sufficient to take advantage of the heated exhaust gases for the purpose of generating steam. A control valve 76 is preferably provided in the coil adjacent the drip tank 73. The presence of steam in the exhaust gases facilitates the reaction in connection with the oxidation of carbon monoxide to produce a harmless dioxide gas. The steam also is beneficial in preventing backfiring.

While for the forms of invention heretofore described it is believed that check valves will permit a sufficient amount of fresh air to enter the oxidation compartment, to carry forward oxidation more efficiently, it is contemplated, in all forms of the invention where fresh air is desired, to force the fresh air in by means of blower fans, pumps, or the like. The blower may be placed at the discharge end of the muffler, in which case the suction end of the same is attached to the tube leading from the muffler, pumping air thru the oxidation chamber and muffler, the same inleting thru the check valves. The blower or pumps may be placed just before the oxidation chamber or compartment, and to this end as illustrated in Figure 11 a blower or pump 80 is illustrated, supported upon the oxidation receptacle, having a conduit 81 entering the exhaust gas line or pipe 71, for the purpose of blowing suitable amounts of fresh air thru the passageway 75 of the pipe 71, in advance of the oxidation chamber, for the purpose of preheating the air, and rendering the reaction more favorable.

As is illustrated in Figure 12 of the drawings, a blower 85 may be employed, suitably mounted on the internal combustion engine A or in any other suitable position, having an air line 86 connected by suitable coupling 87 thru the exhaust manifold or exhaust gas pipe 88, immediately adjacent the internal combustion engine A. This feature of the invention may be used alone, or in combination with other features of the invention, for it can be readily understood that by forcing the fresh air into the exhaust line immediately adjacent the internal combustion engine, a sufficient dilution of the exhaust gases and fresh air may be brought about, during the long travel which the exhaust gases must have to reach the muffler, in order to render oxidation of the carbon monoxide gases more efficient, so that they will be practically neutralized and rendered harmless upon discharge from the muffler. This feature has been shown in detail in Figure 12, but it is to be understood that in any of the forms of the invention, where such is desired, the fresh air may be forced or otherwise entered into the exhaust gases adjacent the internal combustion engine exhaust manifold.

Figure 13:
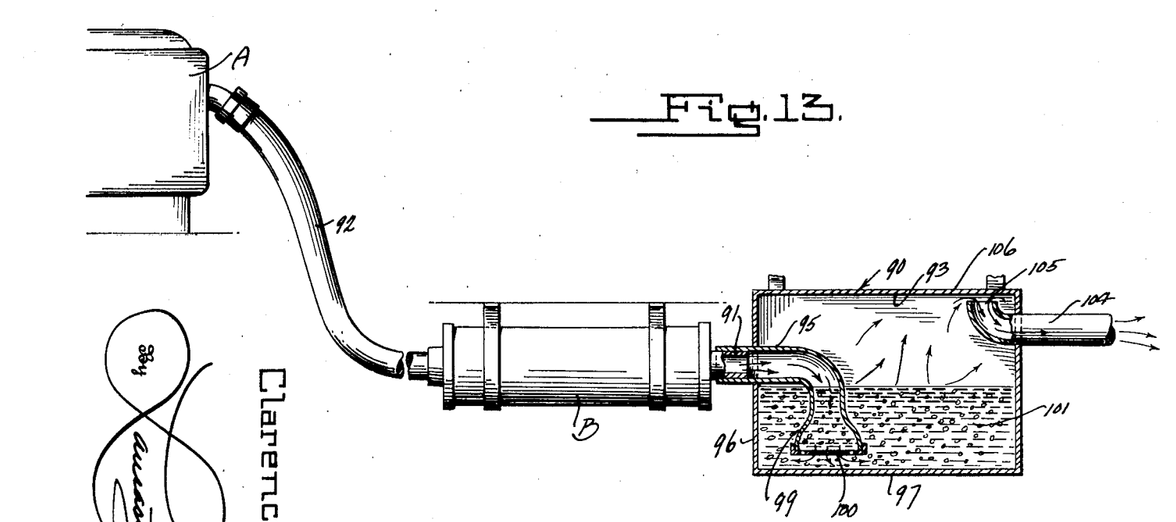
Figure 13 is a side elevation, partly in section of apparatus cooperatively related to the exhaust manifold and muffler of an internal combustion engine, for the absorption treatment of carbon monoxide gases, to neutralize the same.

Referring to the apparatus illustrated in Figure 13, the same shows means for rendering harmless the exhaust gases of an internal combustion engine, using the absorption process. This form of the invention contemplates the provision of an absorption receptacle 90, connected upon the pipe 91 of the muffler D. The muffler D is connected in any approved manner by means of pipe 92 with the exhaust manifold of the internal combustion engine A, and the apparatus only contemplates the provision of means connected at the discharge end 91 of the muffler D. This receptacle 90 is of any approved type, providing a compartment 93 therein adapted to receive a chemical therein, preferably in liquid form, thru which the exhaust gases must discharge in bubble or finely divided condition, for the purpose of absorbing oxygen or other desirable characteristics from the chemical, to render the carbon monoxide gas of the exhaust gases harmless, and to neutralize the same. The receptacle 90 is provided with a substantially L-shaped conduit 95, having an end thereof passing thru the end wall 96 of the receptacle 90, for receiving therein the discharge 91 of the muffler D. The L-shaped conduit 95 enters the compartment 93, and extends down within said compartment, to adjacent the bottom 97 thereof, and adjacent said bottom 97 said L-shaped conduit 95 is provided with a bell shaped or otherwise enlarged discharge end 99, having a perforated screen or filter 100, across the discharge opening thereof, for the purpose of causing the exhaust gases to bubble in a finely divided condition into the liquid 101 within the compartment 93. The liquid 101 of course is placed in the compartment 93 at a level to cover the discharge end of the coupling 95, and in the space above the level of the liquid 101 a discharge conduit 104 is provided for the receptacle 90, having its open end 105 in the compartment 93 facing the top wall 106 of the receptacle 90. If desired, approved filter or other indicating means, such as a gage may be provided for informing an observer as to the liquid level of the absorbent in the receptacle 90. As absorbent materials or fluids, any of the following may be selected:—ammoniacal solution of cuprous salts; ammoniacal solution of cuprous chloride; acid solutions of cuprous chloride; Fehling solution, formed by dissolving cupric hydroxide in aqueous solution of sodium tartrate; potassium hydroxide solution; ammoniacal solutions of silver nitrate or other silver salts; chlorides of noble metals; or permanganic solution.

In a further form of invention, used to render carbon monoxide gases harmless or to neutralize the effects of the same, I prefer to use a reagent, more or less in a solid state which chemically reacts with carbon monoxide when the latter passes over such reagent. The reagent may consist of a chemical spread over some inert carrier, such as brick, fireclay, pumice stone, or the like, and causes a reaction which removes the carbon monoxide from the exhaust gases. As an example of the chemical reagent which may be used, I prefer to use iodine pentoxide and fuming sulphuric acid, placed upon the inert carrier as above mentioned. While the reaction of this chemical will probably produce sulphur dioxide, the same may be taken care of by other absorbents. For the reagent I may also use metallic oxides, such as copper oxide; iron oxide; silver oxide; cobaltic oxide; or yellow mercuric oxide. Fused alkalies may also be used, such as soda lime, and potassium and sodium hydroxides.

Figure 14:
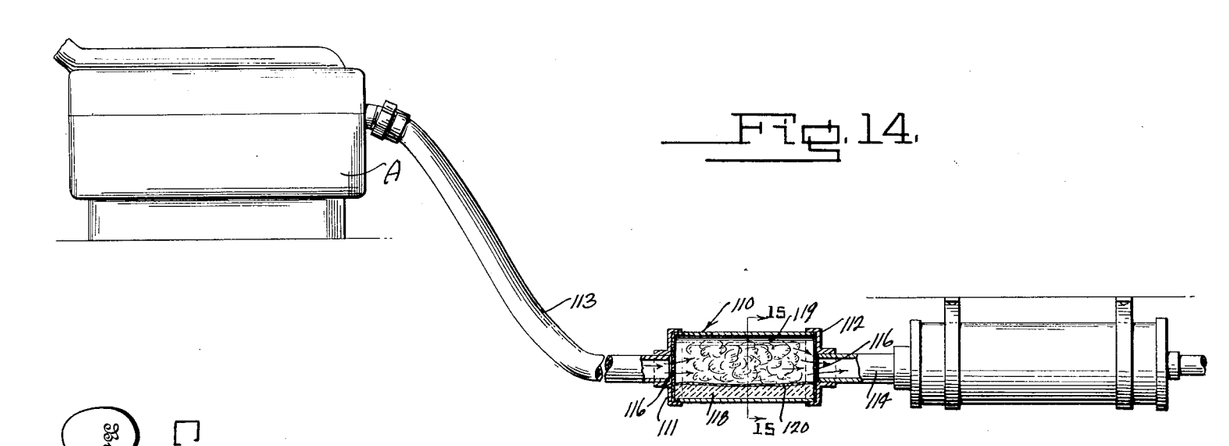
Figure 14 is a side elevation of improved apparatus embodying an internal combustion engine exhaust manifold and muffler, with an oxidation receptacle between the same, in the line of flow of exhaust gases, for the non-fluid chemical treatment and reaction upon carbon monoxide gases, for elimination and neutralization thereof.
Figure 15:
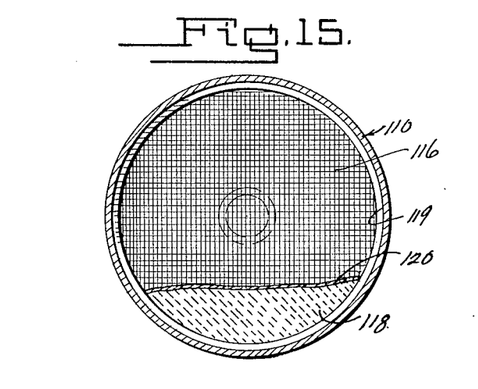
Fig. 15 is a cross sectional view taken on the line 15—15 of Fig. 14.

For the apparatus to support the reagents of the last mentioned treatment I prefer to provide a substantially cylindrical shaped receptacle or oxidizer 110, having preferably detachable end covers 111 and 112, provided with openings therein, with which the sections 113 and 114 of the exhaust gas discharge pipe connect; the receptacle 110 thus being placed on a horizontal axis in the exhaust pipe line between the internal combustion engine A and muffler B. Screens 116 and 117 are clamped across the inlet and exhaust openings in the end covers 111 and 112 of the receptacle 110, thru which the exhaust gases must filter. The inert material 118 may be placed in the receptacle compartment 119 in any approved manner, such as illustrated in the drawings, and the chemical reagent 120, either in fluid or solid, or semi-solid, or other condition may be spread upon this inert carrier, in such relation as not to obstruct the passage of the exhaust gases, but in such relation that the exhaust gases must of necessity pass thereover, thru the compartment 119, in order to oxidize the carbon monoxide gas and render the same harmless.

From the foregoing description of this invention it is apparent that a novel process and novel apparatus for the elimination and neutralization of carbon monoxide gases of internal combustion engine exhaust gases have been provided, which specifically attack the carbon monoxide gas, to render the same neutral. I am aware that other processes have heretofore been devised for reacting with the exhaust gases, but so far am not aware that the carbon monoxide gas has been specifically attacked. Of the above forms of inventions all of them directly cooperate to eliminate the carbon monoxide gas, specifically, and while all of the forms of invention present interesting and practical features, probably the most economical and simplest form of invention, practical for use upon motor vehicles, is the direct air oxidation treatment.

Various changes in the steps of the process, and in the shape, size, and arrangement of parts of the apparatus shown, may be made to the forms of the invention without departing from the spirit of the same or the scope of the claims.

I claim:

1. That process of eliminating carbon monoxide gases from internal combustion engine exhaust gases which consists in causing the heated exhaust gases to travel over a predetermined path, feeding live steam into the exhaust gases, causing a body of fresh air to pass into the body of exhaust gases, and subsequently heating the exhaust gases and fresh air prior to discharge of the exhaust gases.

2. That process of converting the carbon monoxide gas of internal combustion engine exhaust gases into a harmless gas which consists in causing the exhaust gases to flow thru a predetermined path, and adding a body of steam thereto, subsequently admitting a body of fresh air to the exhaust gases, subsequently heating the body of fresh air and exhaust gases combined, subsequently causing the exhaust gases to travel over a reacting catalytic agent, and then discharging the exhaust gases.

CLARENCE WILBUR WHITE.